G. W. WHITEMAN.
INSULATED RAIL JOINT.
APPLICATION FILED MAR. 2, 1909.

941,175.

Patented Nov. 23, 1909.

Witnesses:
Wills A. Burrowes
Walter Chism.

Inventor:
George W. Whiteman,
by his Attorneys

UNITED STATES PATENT OFFICE.

GEORGE W. WHITEMAN, OF PHILADELPHIA, PENNSYLVANIA, ASSIGNOR TO CHRISTIAN J. BUCK, OF GALLITZIN, PENNSYLVANIA.

INSULATED RAIL-JOINT.

941,175.  Specification of Letters Patent.  Patented Nov. 23, 1909.

Application filed March 2, 1909. Serial No. 480,942.

*To all whom it may concern:*

Be it known that I, GEORGE W. WHITEMAN, a citizen of the United States, residing in Philadelphia, Pennsylvania, have invented certain Improvements in Insulated Rail-Joints, of which the following is a specification.

My invention relates to rail joints; and the object of my invention is to provide a simple form of insulated joint possessing material advantages over insulated joints in present use in the ease with which it may be disposed in place and set up and tightened when loosened by wear.

Figure 1:
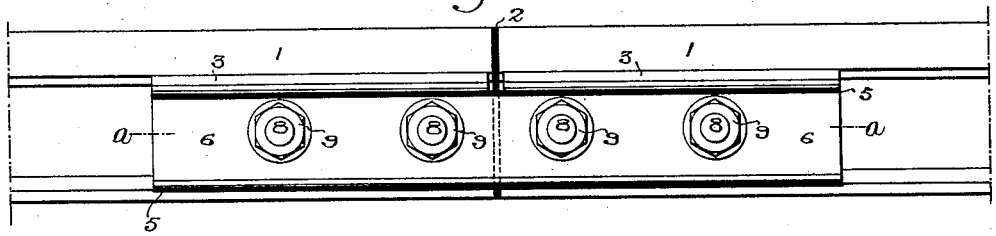
Figure 2:
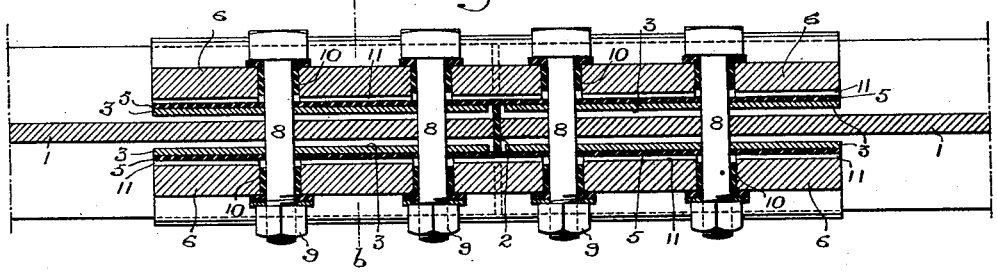
Figure 3:
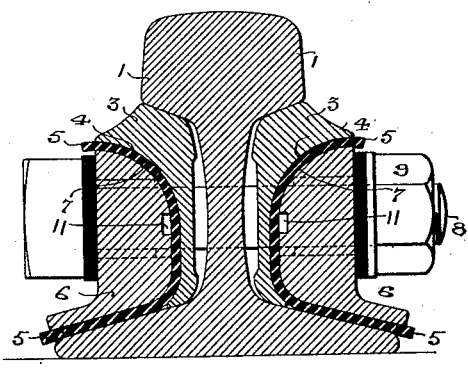
Figure 4:
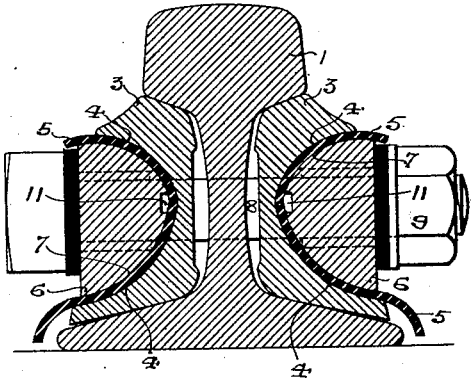
Figure 5:
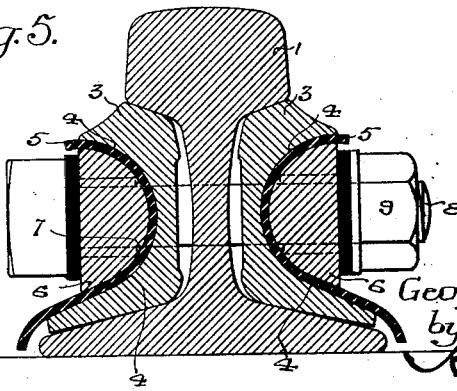

My invention is fully shown in the accompanying drawings, in which:

Figure 1, is a side elevation of an insulated joint constructed in accordance with my invention; Fig. 2, is a sectional plan view, on the line *a—a*, Fig. 1; Fig. 3, is a cross sectional view, on the line *b—b*, Fig. 2, and Figs. 4 and 5, are sectional views of the same character as Fig. 2, illustrating modifications embodying my invention.

My invention consists of a structure designed for insulating both of the meeting ends of the rail, and comprises an insulated joint having outer splice bars, discontinuous inner filler members or filler bars next to the rails, and sheet insulation between the splice bars and the filler members; the latter being arranged to engage the under side of the rail heads and having their outer wall concaved from end to end. The area of the upper portion of such concaved wall, which is substantially a flange, is greater than the area of the under sides of the rail heads, whereby an increased bearing area is provided for the insulation with a consequent reduction of the fiber strain.

The essential feature of my invention is to avoid the formation of angular bends in the fiber forming the insulation, as illustrated in prior joints of a similar nature, and to this end I provide, as clearly illustrated in the cross sectional views, inner filler bars or members having concaved and curved faces to receive the sheet of insulation which is correspondingly bent and curved and held in place by splice-bars having a curved surface of similar character in cross section. By having a curved bearing surface for the insulating material I am enabled to provide the greatest amount of bearing surface with the least material. This idea is carried out in all the forms of my improved structure, although exteriorly each joint is substantially the same, and hence I have shown but one elevation, which may be understood to represent any of the constructions illustrated in the sectional views.

In the drawings, 1, 1, represent the meeting ends of the rail, between which I place an insulating post 2, which may be of a contour conforming to the flange of the rail, with an upwardly projecting portion extending to the rail head. The filler bars or members are indicated at 3, and, as shown in the cross sectional views, Figs. 3, 4 and 5, are of a contour to substantially hug the under side of the head and the upper side of the flange of the rail in the same manner as an ordinary splice-bar. The filler members shown in Fig. 3, however, have the greater portion of the lower flange omitted. The outward surface 4 of these filler bars, however, is recessed or concaved in the manner shown; such surface being extended in a full curve so as to avoid the necessity of sharp angles in the cross section of the sheet of insulation.

The insulation is indicated at 5 and fits the curved wall of the filler bar or member. For holding such insulation in place and retaining the filler bars against longitudinal movement, I provide means comprising splice-bars 6, having a suitable convexly curved inner wall 7 to meet and engage the sheet of insulation in the manner indicated; said splice-bars being held in place by suitable bolts 8 and nuts 9, and the bolts may be provided with the usual insulating sleeves 10.

The sheet of insulation projects beyond the outer wall of the splice-bars whereby I insure a bearing area greater in extent than the under side of the rail head and thereby considerably reduce the strain upon the fiber during the use of the structure. The lower portion of the insulation is also preferably carried over the flange of the rail or the foot of the filler members in the manner shown.

In the structure shown in Fig. 4, the foot of the filler members is extended over the flange of the rail, having a portion disposed a slight distance away from the flange of the rail, which construction affords a chance for the filler bars to spread slightly when the splice-bars are tightened in order to take up any wear in the joint.

In the structure shown in Fig. 5, the curved surface or wall of the filler bars or members is a complete semi-circle, and the sheet of insulation as well as the splice bar will be curved accordingly so as to take into the same. In this instance, the feet of the filler bars may be positioned a slight distance away from the flange of the rail, as indicated in Fig. 4, or they may be shorter and engage the said flange, as indicated in Fig. 2.

In the construction illustrated in Figs. 3 and 4, in which the insulation is not formed in a single curve, there may be some slight difficulty in fitting the insulation into its proper seat and ready to receive the splice-bars. To avoid this difficulty the splice-bars shown in these figures may be grooved from end to end as indicated at 11, at a point substantially opposite the change in the surface of the insulation. As the cross-section of the insulation in the construction shown in Fig. 5, is a true semi-circle, there will be no necessity of grooving the splice-bars used therewith.

In all instances, the cross section of the sheet of insulation shows curved lines, which make for ease in shaping the insulation by avoiding the formation of sharp corners which would tend to strain and destroy the fiber of the insulation; such curved condition materially assisting the setting up of the members of the joint when the same become loosened under traffic wear, and providing the greatest amount of bearing surface with the least material.

I claim:

1. In an insulated rail joint, the combination with the meeting ends of rails, continuous splice-bars, and discontinuous filler members, of insulation disposed between said filler bars and splice-bars and having a curved shape, the walls of the filler bars and splice-bars being recessed and curved to receive such insulation between them and the curves of the filler-bars, splice-bars and insulation being substantially semi-circular in cross section.

2. In an insulated rail joint, the combination with the meeting ends of rails, continuous splice-bars, and discontinuous filler members, of insulation disposed between said filler bars and splice-bars and having a curved shape, the walls of the filler bars and splice-bars being recessed and curved to receive such insulation between them and the curves of the filler-bars, splice-bars and insulation being substantially semi-circular in cross section, such construction providing the greatest amount of bearing surface with the least material.

3. In an insulated rail jont, the combination with the meeting ends of rails, continuous splice-bars, and discontinuous filler members disposed between said splice-bars and rail ends, of continuous sheets of insulation disposed between said filler bars and splice-bars and having a curved shape, the walls of the filler bars being concaved and the splice-bars being convexly curved to receive said sheets of insulation between them and the curves of the filler-bars, splice-bars and insulation being substantially semi-circular in cross section.

4. In an insulated rail joint, the combination with the meeting ends of rails, continuous splice-bars, and discontinuous filler members disposed between said splice-bars and rail ends and having feet or flanges overlying the flange of the rail, of continuous sheets of insulation disposed between said filler bars and splice-bars and having a curved shape, the walls of the filler members being concaved and the splice-bars being convexly curved to receive said sheets of insulation between them and the curves of the filler-bars, splice-bars and insulation being substantially semi-circular in cross section, and the feet of the filler members being disposed a slight distance from the flange of the rail.

5. The combination, in an insulated rail joint, of the meeting ends of the rails, discontinuous filler members having concaved side walls paralleling the rail ends, sheet insulation covering the surface of such concaved walls and extending between the outer ends of the filler members and bridging the latter, splice-bars having convexly curved walls fitting against said insulation and holding the latter to the filler members the curves of the filler-bars, splice-bars and insulation being substantially semi-circular in cross section, and means for holding the splice-bars, insulation, and filler members to the rail ends.

6. The combination, in an insulated rail joint, of the meeting ends of the rails, discontinuous filler members having concaved side walls paralleling the rail ends, sheet insulation covering the surface of such concaved walls and extending between the outer ends of the filler members and bridging the latter, splice-bars having convexly curved walls fitting against said insulation and holding the latter to the filler members the curves of the filler-bars, splice-bars and insulation being substantially semi-circular in cross section, and means for holding the splice-bars, insulation, and filler members to the rail ends, said splice bars having their wall adjacent the insulation grooved from end to end.

7. In an insulated rail joint, the combination of the meeting ends of the rails, a continuous splice-bar and discontinuous filler members of insulation disposed between said filler-bars and splice bar and having a curved shape, the walls of the filler-bars and splice-bar being recessed and curved to receive such insulation between them, and the curves of the filler-bars, splice-bar and insulation being substantially semi-circular in cross section.

In testimony whereof, I have signed my name to this specification, in the presence of two subscribing witnesses.

GEORGE W. WHITEMAN.

Witnesses:
MURRAY C. BOYER,
WM. A. BARR.